(12) United States Patent
Donckels et al.

(10) Patent No.: US 7,721,780 B2
(45) Date of Patent: May 25, 2010

(54) MONOPLY PNEUMATIC RUN-FLAT TIRE WITH COMPOSITE PLY CORD

(75) Inventors: Yves Donckels, Natoye (BE); Serge Julien Auguste Imhoff, Schrondweiler (LU); René François Reuter, Burden (LU); Filomeno Gennaro Corvasce, Mertzig (LU); Massimo Di Giacomo Russo, Helmsange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 816 days.

(21) Appl. No.: 11/186,322

(22) Filed: Jul. 21, 2005

(65) Prior Publication Data

US 2007/0017620 A1    Jan. 25, 2007

(51) Int. Cl.
*B60C 17/00*    (2006.01)
*B60C 9/00*    (2006.01)
*B60C 9/04*    (2006.01)
*D02G 3/04*    (2006.01)
*D02G 3/48*    (2006.01)
*D07B 1/02*    (2006.01)

(52) U.S. Cl. .................... 152/517; 57/210; 57/902; 152/451; 152/556; 152/557

(58) Field of Classification Search ............ 152/451, 152/517, 556, 557; 57/210, 232, 234, 902; 428/377
See application file for complete search history.

(56) References Cited

U.S. PATENT DOCUMENTS

| | | | | |
|---|---|---|---|---|
| 2,755,214 A | * | 7/1956 | Lyons et al. | 152/557 X |
| 3,938,313 A | * | 2/1976 | Marzocchi | 57/234 X |
| 3,983,919 A | * | 10/1976 | Messerly | 152/517 |
| 4,343,343 A | | 8/1982 | Reuter | |
| 4,877,073 A | | 10/1989 | Thise et al. | |
| 4,893,665 A | | 1/1990 | Reuter et al. | |
| 4,914,902 A | * | 4/1990 | Keefe, Jr. | 57/210 |
| 5,558,144 A | | 9/1996 | Nakayasu et al. | |
| 6,237,661 B1 | * | 5/2001 | Asano | 152/517 X |

(Continued)

FOREIGN PATENT DOCUMENTS

EP    0 329 590 A    8/1989

(Continued)

OTHER PUBLICATIONS

European Search Report, completed Sep. 26, 2008.

(Continued)

*Primary Examiner*—Adrienne C Johnstone
(74) *Attorney, Agent, or Firm*—Robert N. Lipcsik

(57) ABSTRACT

A pneumatic tire has a single carcass ply, at least one belt ply disposed radially outward of the carcass ply in a crown portion of the tire, and at least one insert located adjacent the carcass ply in a sidewall portion, the insert providing support for the tire load to enable the tire to operate in underinflated conditions. The carcass ply is comprised of at least one composite cord. The composite cord is formed of at least two first yarns twisted helically about at least one second yarn. The first yarns and the second yarn having different modulus of elasticity, the first yarns having a modulus greater than the modulus of the second yarn.

8 Claims, 2 Drawing Sheets

U.S. PATENT DOCUMENTS

| | | | |
|---|---|---|---|
| 6,494,242 B2 * | 12/2002 | Cottrell | 152/517 X |
| 6,601,378 B1 | 8/2003 | Fritsch et al. | |
| 6,695,025 B1 | 2/2004 | Roesgen et al. | |
| 6,701,986 B2 * | 3/2004 | Tanaka | 152/517 X |
| 6,799,618 B2 | 10/2004 | Reuter et al. | |
| 6,988,522 B2 * | 1/2006 | Colantonio et al. | 152/517 |
| 7,077,182 B2 * | 7/2006 | Nagahara et al. | 152/517 |
| 2004/0265581 A1 | 12/2004 | Esnault et al. | |

FOREIGN PATENT DOCUMENTS

| | | | |
|---|---|---|---|
| JP | 05179531 A | * | 7/1993 |
| JP | 06280122 A | * | 10/1994 |
| JP | 2005 161998 | | 6/2005 |

OTHER PUBLICATIONS

Patent Abstracts of Japan, Publication No. 2005161998 dated Jun. 23, 2005.

\* cited by examiner

MONOPLY PNEUMATIC RUN-FLAT TIRE WITH COMPOSITE PLY CORD

FIELD OF THE INVENTION

The present invention is directed towards a pneumatic tire. More specifically, the present invention is directed towards a pneumatic tire wherein the single carcass reinforcement layer is comprised of a multi-modulus, or hybrid, cord.

BACKGROUND OF THE INVENTION

WO 03/060212 A1 discloses a hybrid cord for use in pneumatic tires, designed for use as an overlay. The hybrid cord is formed of two different materials: a low initial modulus core yarn and high modulus wrap yarns. The selection of the yarns is such that the "break point" of the cord, i.e. when the slope of the force versus elongation curve changes from a relatively low slope to a relatively high slope, occurs at an elongation between 2% and 3% elongation, with an ultimate cord break at just over 5% elongation.

U.S. Pat. No. 6,799,618 B1 discloses a hybrid cord for use as an overlay in pneumatic tires. The hybrid cord is formed of aramid and nylon twisted together, wherein the break point of the cord is at an elongation between 4% and 6% elongation, with an ultimate cord break at over 10% elongation.

The above publications describe the use of a hybrid cord especially for the overlay. In an overlay, the hoop reinforcing effects of a strong cord are desired, however, the cord must have elongation properties to a degree to permit the tire to expand into a toroidal shape during tire molding. These were, heretofore, contrary properties when using a single material cord.

In U.S. Pat. No. 6,695,025 B1 (Roesgen) discloses a runflat tire having two carcass reinforcing plies and reinforcing wedge inserts in the tire sidewalls. As noted in Roesgen, the wedge inserts resist radial deflection of the tire with a combination of compressive and bending stresses in both the inflated as well as the uninflated conditions. Runflat tires experience a net compressive load in the region of the sidewall closest to the road-contacting portion of the tire. Additionally, the outer portions of the sidewall experience tensile forces while the inner portions of the sidewall undergo compression stresses during bending. Roesgen solves the issue of balancing the necessary flexibility in the inflated state with the rigidity in the uninflated state problem by employing two reinforcing carcass plies. The axially outermost ply has cords that have a modulus of elasticity that increases with strain. The axially innermost ply has cords having a modulus that exceeds that of the outermost ply during normal loads in an inflated state; thus the innermost ply handles the majority of the load during normal operation, and the outermost ply does not equally contribute to the load carrying. When the tire is operated in uninflated states, the load is shifted from the axially innermost ply to the axially outermost ply and again the plies do not equally contribute to the load carrying. Roesgen teaches that the outermost ply does not contribute to the overall rigidity of the tire sidewall during normal inflation operation.

SUMMARY OF THE INVENTION

The present invention is directed towards a tire wherein the bending behavior of the tire components is optimized to achieve improved comfort and handling performance. Also disclosed is a pneumatic run-flat tire wherein the bending behavior from the inflated to deflated state is optimized to improve run-flat performance.

According to one aspect of the invention, a pneumatic tire has a single carcass ply, at least one belt ply disposed radially outward of the carcass ply in a crown portion of the tire, and at least one insert located adjacent the carcass ply in a sidewall portion, the insert providing support for the tire load to enable the tire to operate in underinflated conditions. The carcass ply is comprised of at least one composite cord. The composite cord is formed of at least two first yarns twisted helically about at least one second yarn. The first yarns and the second yarn having different modulus of elasticity, the first yarns having a modulus greater than the modulus of the second yarn.

In another aspect of the invention, the first and second yarns are organic fiber yarns selected from the group of materials of aramid, PK, PBO, rayon, nylon, polyester, PET, and PEN. Preferably, the first yarns of the composite cord are selected from the group consisting of aramid, PK, and PBO and the second yarns are selected from the group consisting of rayon, nylon, polyester, PET, and PEN.

In another aspect of the disclosed invention, the first yarns have a linear density value in the range of 550 to 3300 dtex, while the second yarns have a linear density value in the range of 940 dtex to 3680 dtex.

In forming the composite cords, the number of first yarns is less than ten while the number of second yarns is less than five. Preferred ratios of first and second yarns are 2/1, 3/1, 2/2, 3/2, 2/3, 3/3, or 4/3.

In another disclosed aspect of the invention, when forming the reinforcing carcass ply, the composite cords are arranged to have an end count per inch in the range of 15-32 (5.9-12.6 ends per cm).

BRIEF DESCRIPTION OF THE DRAWINGS

The invention will be described by way of example and with reference to the accompanying drawings in which.

DETAILED DESCRIPTION OF THE INVENTION

Figure 1:
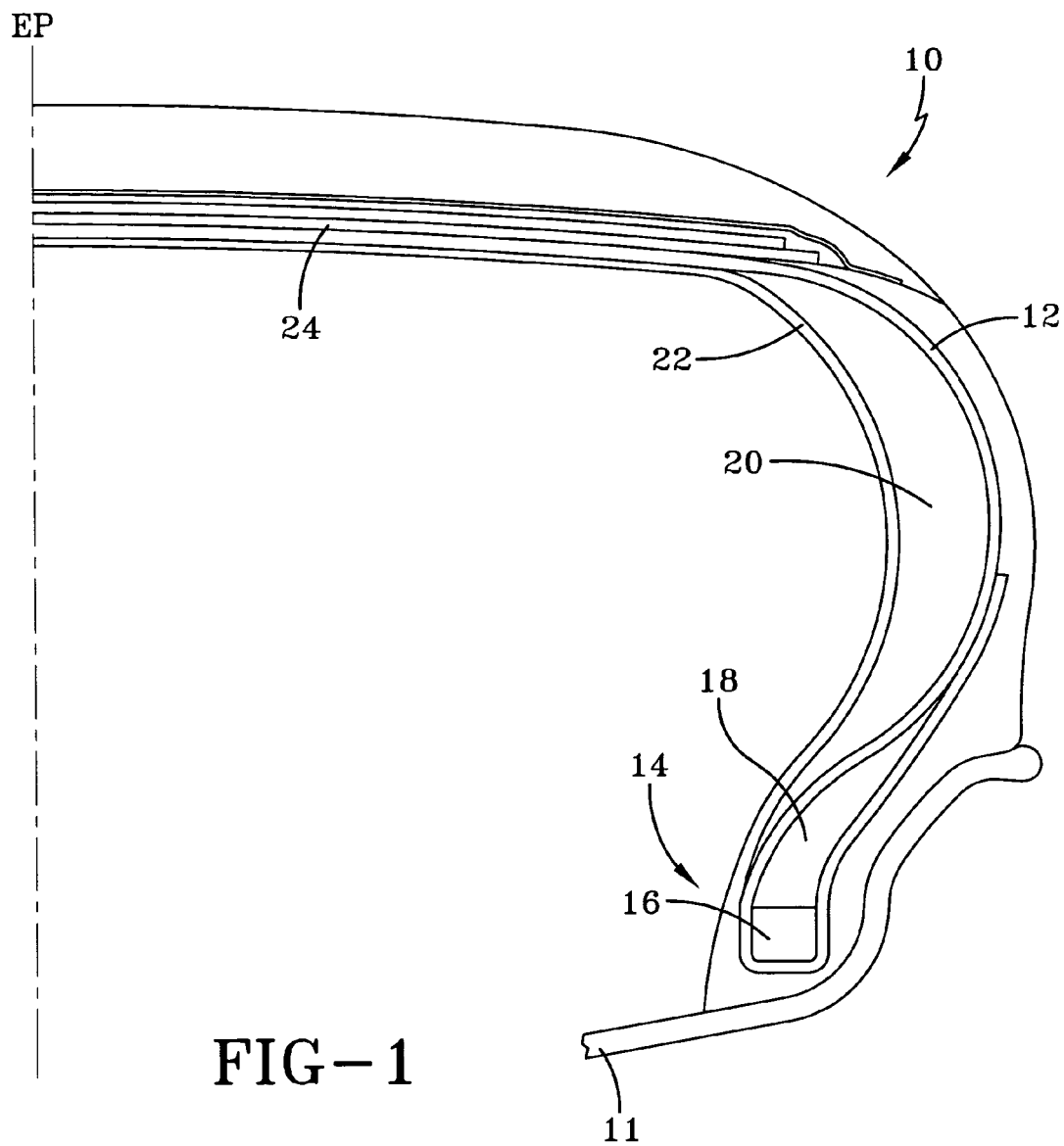
FIG. 1 is a cross sectional view of a tire.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

FIG. 1 is a cross-sectional view of a tire 10, mounted on a tire rim 11, designed to be capable of continued operation during under-inflated or deflated conditions. Only one half of the tire is shown, it being understood that, conventionally, the other half is a mirror image of that which is illustrated. The tire has a single reinforcing ply 12, the ply 12 extending from one bead area 14 of the tire to an opposing bead area. The ends of the reinforcing ply 12 are turned axially inward to axially outward about bead cores 16 and bead apexes 18. The terminal ends of the reinforcing ply 12 extend past the radially outer ends of the bead apexes 18 enveloping the bead apexes 18.

Located in each sidewall region of the tire 10 is a sidewall insert 20. The insert 20 may be located adjacent to the tire innerliner 22 or axially outward of the reinforcing ply 12. The insert is formed of elastomeric material and extends from the crown area, preferably from radially inward of the belt structure 24, to radially inward of the outermost terminal end of the bead apexes 18, overlapping the bead apexes 18. The elastomeric material of the insert is selected to provide the tire with support during underinflated operation of the tire.

In the crown area of the tire is a belt structure 24, located radially outward of the carcass ply 12. The belt structure 24 has at least two inclined, crossed cord plies. The cords in the belt plies are inclined with respect to the circumferential direction and preferably, the cords in directly adjacent plies are inclined at similar but opposing angles to each other. Outward of the cross cord plies may be an overlay ply. The overlay ply has a width equal or greater than the maximum width of the crossed cord plies, encapsulating the crossed cord plies between the overlay ply and the carcass reinforcing plies. The overlay ply is reinforced with cords inclined at angles of 15° or less, preferably at 0°, relative to the equatorial plane of the tire.

Figure 2:
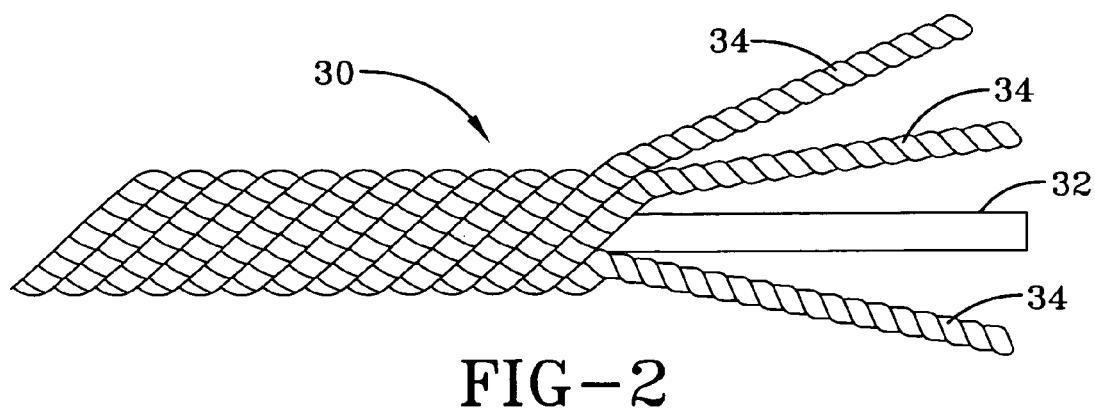
FIG. 2 is a cord construction.

In accordance with the present invention, the carcass ply 12 is formed from a cord 30 as seen in FIG. 2. The cord 30 is a composite cord made of filament yarns of appropriate stress-strain characteristics to provide the tire with additional bending resistance when the tire operates in run-flat mode. The cord 30 is formed of at least one low modulus yarn 32 about which is twisted at least one high modulus yarn 34. The construction of the yarn allows the lower modulus component of the yarn 30 to work at relative low strain, i.e. the inflated tire mode, until the cord has reached an allowable elongation, from which point, only the high modulus component will be under tension, i.e. the run-flat tire mode, and will limit the stretch of the cord.

Possible reinforcing materials for either the high or low modulus yarns include, but are not limited to, aramid, polyethylene ketone (PK), polyphenylene-2,6-benzobisoxazole (PBO), rayon, polyester, polyamide, polyethylene terephthalate (PET), polyethylene napthalate (PEN), and polyvinyl alcohol (PVA). Preferably, the high modulus yarns are formed from aramid, PK, PVA, or PBO, while the low modulus yarns are formed from rayon, nylon, polyester, PET, or PEN. The final material selection is based on the desired stress/strain characteristics of the cord 30. The main requirement is that the wrap yarns have a modulus greater than the core yarns. Thus, the wrap yarns may be aramid with rayon core yarns or the wrap yarns may be PEN with nylon core yarns.

The number of core low modulus yarns 32 is not greater than five while the number of wrap high modulus yarns is not greater than ten. Preferably, the number of high modulus yarns 34 versus low modulus yarns 32 in the cord 30 is 2/1, 3/1, 2/2, 3/2, 3/3, or 4/3.

To obtain the desired strength characteristics of the cord 30 that enable the cord to support the tire during regular inflated mode, the core yarns 32 have a linear density value in the range of 940 dtex to 3680 dtex; including PET 1100, 1440, 1670, and 2200 dtex, Rayon 1220, 1840, & 2440 by way of specific, but not limiting, examples. The wrap yarns 34 have a linear density value in the range of 550 dtex to 3300 dtex, including 1100 and 1670 dtex fiber by way of specific, but not limiting examples.

In the cord 30, each of the yarns 32, 34 has its component filaments twisted together a given number of turns per unit of length of the yarn 32, 34 (usually expressed in TPI) and additionally the yarns 32, 34 are twisted together a given number of turns per unit of length of the cord 30. The direction of twist refers to the direction of slope of the spirals of a yarn or cord when it is held vertically. If the slope of the spirals conform in direction to the slope of the letter "S", then the twist is called "S" or "left hand". If the slope of the spirals conform in direction to the slope of the letter "Z", then the twist is called "Z" or "right hand". An "S" or "left hand" twist direction is understood to be an opposite direction from a "Z" or "right hand" twist. "Yarn twist" is understood to mean the twist imparted to a yarn before the yarn is incorporated into a cord, and "cord twist" is understood to mean the twist imparted to two or more yarns when they are twisted together with one another to form a cord. "dtex" is understood to mean the weight in grams of 10,000 meters of a yarn before the yarn has a twist imparted thereto.

Cords that are useable in the present invention include, but are not limited to cords of the following construction: 1100/2+1840/2 dtex, twisted 10Z/(10.4Z/7S)/3S (meaning that two yarns of 1100 dtex yarn have a yarn twist of 10 TPI in the Z direction, two yarns of 1840 dtex each have a yarn twist of 10.4 TPI in the Z direction and are twisted together for an intermediate cord twist of 7 TPI in the S direction, and after the 1100 dtex yarns are wrapped about the twisted 1840 dtex yarns, the four yarns receive a cord twist of 3 TPI in the S direction); 1100/2+1220/2; 1100/2+1440/2; 1670/2+1220/2, 1670/2+1840/2 and 1100/3+1840/2. One preferred cord construction is low modulus core yarns 32 of rayon and high modulus wrap yarns 34 of aramid. In selecting a cord structure, the wrap and core yarns do not have to have a preferred strength ratio; as noted above, the main requirement is to have the modulus values of the wrap and core yarns differ so that the cord responds properly under different loads and tire operation.

The cords of the present invention have a diameter in the range of 0.6 to 1.6 mm. When calendering the cords 30, the end count per inch (EPI) of the hybrid cord is in the range of 15 to 32 (5.9-12.6 ends per cm, epcm), preferably 15-25 ends per inch (5.9-9.8 epcm).

A comparison was made between two control tires and two runflat monoply tires with carcass cords in accordance with the present invention. The tires were of identical construction, except for the cord material of the carcass ply and are identified in Table 1 below.

TABLE 1

| Tire | Carcass Material | # Plies | EPI |
|---|---|---|---|
| Control 1 | Rayon 1220/2, 12.3/12.3 tpi | 2 | 31 |
| Control 2 | Aramid 1100/2, 16/16 tpi | 1 | 30 |
| A | Rayon/Aramid 1100/2 + 1840/2, 10Z/(10.4Z/7S)/3S | 1 | 18 |
| B | Rayon/Aramid 1100/2 + 1840/2, 10Z/(10.4Z/7S)/3S | 1 | 22 |

Figure 3:
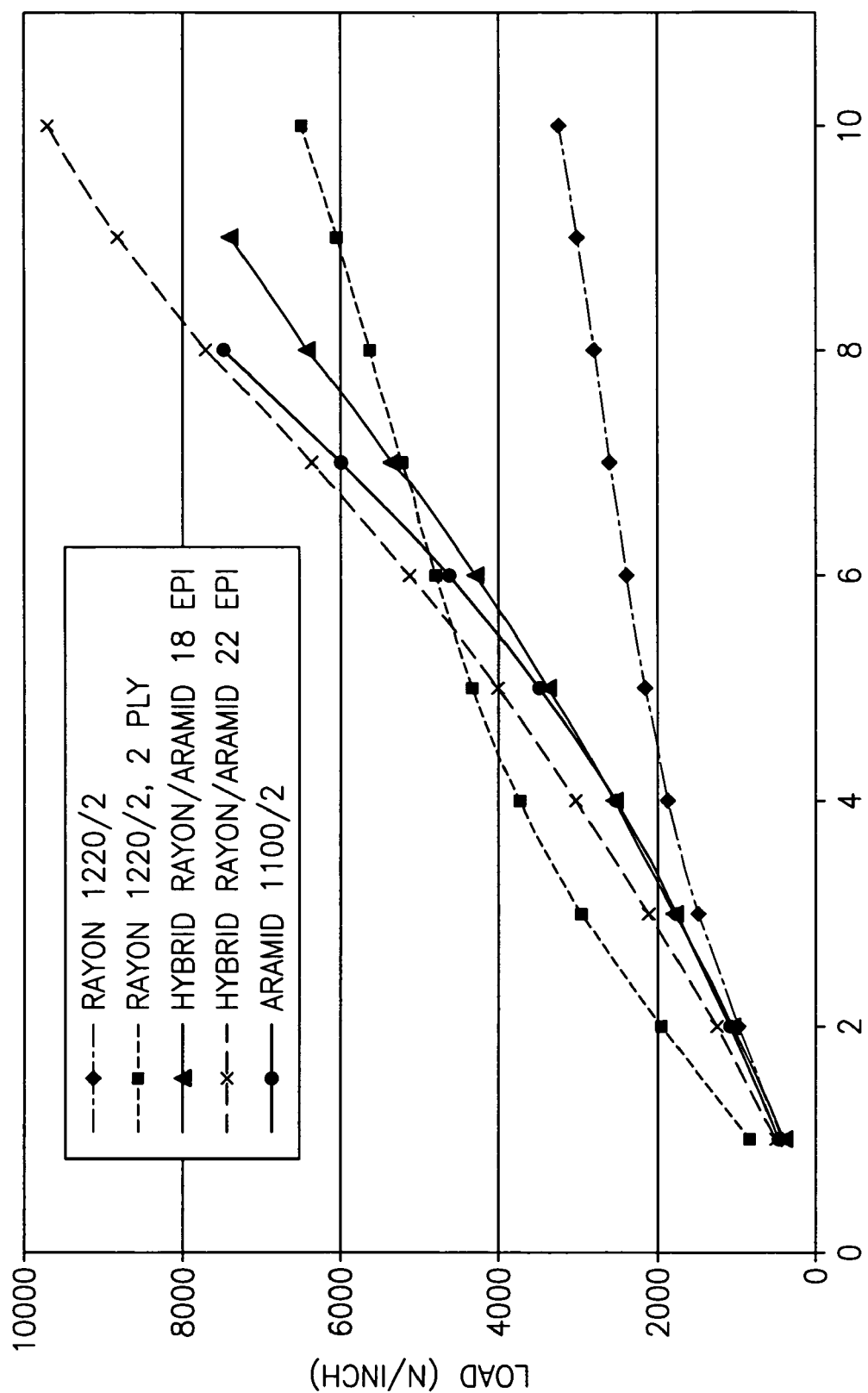
FIG. 3 is a chart showing the load versus elongation values for different carcass ply constructions.

The elongation versus load characteristics for the carcass plies of the cords of Table 1 are shown in FIG. 3. The rayon cord monoply has an ultimate elongation of about 10% at a maximum load of about 3,200 N/inch; while the dual rayon ply has an ultimate elongation at a load almost double that at 6,400 N/inch. The aramid cord has an ultimate elongation of about 8% at a maximum load of about 7,500 N/inch. The two hybrid cord plies have ultimate elongations between 9 and 10% at maximum loads of about 7,400 N/inch and 9,700 n/inch, respectively.

The tires were tested for various static and dynamic properties as identified below.

TABLE 2

| Loaded Tire Deflection, 450 kgf | | Control 1 | Control 2 | A | B |
|---|---|---|---|---|---|
| At 0 kPa, mm | | 43.6 | 45.1 | 44.4 | 43.5 |
| At 220 kPa, mm | | 17.0 | 17.7 | 17.3 | 17.1 |
| At 250 kPa, mm | | 15.9 | 16.5 | 16.0 | 15.9 |
| Lab Runflat Mileage, km, | Tire 1 | 163 | 193 | 253 | 286 |
| | Tire 2 | 236 | 224 | 283 | 270 |
| Avg Rolling Resistance Coeff | | 100 | 101 | 101 | 103 |

The above data suggested that for the run-flat tire having a monoply carcass of hybrid cords, the loaded tire deflection is comparable to a conventional two-ply rayon carcass run-flat tire. The hybrid cord is responding to handle the loads when both inflated and deflated. The lab runflat mileage for the hybrid monoply tires is improved over the two control tires. In regards to the average rolling resistance coefficient, measured at 552 kgf, 220 Kpa, the result for control tire 1 is normalized as the standard value at 100, and the greater the value, the better the rolling resistance properties of the tire. The hybrid monoply tires showed an improvement in the rolling resistance coefficient over the control tire 1.

Thus, while reducing the overall weight of the tire, and simplifying construction of the run-flat tire, the monoply carcass structure, when formed of the disclosed hybrid cords, provides the necessary support to the run-flat tire during both inflated and under-inflated operating conditions.

What is claimed is:

1. A pneumatic tire comprising:
   (a) a single carcass ply extending from one bead area to an opposing bead area;
   (b) at least one belt ply disposed radially outward of the carcass ply in a crown portion of the tire; and
   (c) at least one insert located adjacent the carcass ply in each of two sidewall portions, the insert providing support for the tire load to enable the tire to operate in underinflated conditions wherein
the carcass ply is comprised of at least one composite cord, each said cord comprising at least two organic fiber first yarns twisted helically about at least two organic fiber second core yarns, the first yarns and the second yarns having different moduli of elasticity, the first yarns having a modulus of elasticity greater than a modulus of elasticity of the second yarns, the first yarns having a first yarn twist direction, the second yarns twisting about each other in a second opposite direction, the second yarns having the first yarn twist direction, the first yarns wrapping in the second opposite direction about the second yarns previously twisted about each other, and the entire composite cord having a twist in the second opposite direction, the number of high modulus first yarns versus the number of low modulus second yarns being either 2/2, 2/3, or 3/3.

2. The pneumatic tire of claim 1 wherein the high modulus first yarns are formed from aramid, polyethylene ketone (PK), polyvinyl alcohol (PVA), or polyphenylene-2,6-benzobisoxazole (PBO).

3. The pneumatic tire of claim 1 wherein the low modulus second yarns are formed from rayon, nylon, polyester, polyester in the form of polyethylene terephthalate (PET), or polyester in the form of polyethylene naphthalate (PEN).

4. The pneumatic tire of claim 1 wherein the high modulus first yarns are formed from aramid and the low modulus second yarns are formed from rayon.

5. The pneumatic tire of claim 1 wherein the high modulus first yarns are formed from polyethylene naphthalate (PEN) and the low modulus second yarns are formed from nylon.

6. The pneumatic tire of claim 1 wherein the first yarns have a linear density in the range of 550 dtex to 3300 dtex.

7. The pneumatic tire of claim 1 wherein the second yarns have a linear density in the range of 940 dtex to 3680 dtex.

8. A pneumatic tire comprising:
   (a) a single carcass ply extending from one bead area to an opposing bead area;
   (b) at least one belt ply disposed radially outward of the carcass ply in a crown portion of the tire; and
   (c) at least one insert located adjacent the carcass ply in each of two sidewall portions, the insert providing support for the tire load to enable the tire to operate in underinflated conditions wherein
the carcass ply is comprised of at least one composite cord having an endcount per inch in the carcass ply in the range of 15-32, each said cord comprising two to ten 550 dtex to 3300 dtex aramid first yarns twisted helically about two to five 940 dtex to 3680 dtex rayon second core yarns, the first yarns and the second yarns having different moduli of elasticity, the first yarns having a modulus of elasticity greater than a modulus of elasticity of the second yarns, the first yarns having a first yarn twist direction, the second yarns twisting about each other in a second opposite direction, the second yarns having the first yarn twist direction, the first yarns wrapping in the second opposite direction about the second yarns previously twisted about each other, and the entire composite cord having a twist in the second opposite direction.

* * * * *